Nov. 21, 1967  M. C. SELBY  3,354,411
COAXIAL TRANSMISSION LINE T-JUNCTION HAVING
RECTANGULAR PASSAGEWAY DIMENSIONED BEYOND
CUTOFF FOR HIGHER ORDER MODES
Filed Oct. 22, 1965  2 Sheets-Sheet 1

INVENTOR
Myron C. Selby

BY  Alvin J. Englert

AGENT

Nov. 21, 1967 M. C. SELBY 3,354,411
COAXIAL TRANSMISSION LINE T-JUNCTION HAVING
RECTANGULAR PASSAGEWAY DIMENSIONED BEYOND
CUTOFF FOR HIGHER ORDER MODES
Filed Oct. 22, 1965 2 Sheets-Sheet 2

INVENTOR

Myron C. Selby

BY Alvin J. Englert

AGENT

United States Patent Office 3,354,411
Patented Nov. 21, 1967

3,354,411
COAXIAL TRANSMISSION LINE T-JUNCTION HAVING RECTANGULAR PASSAGEWAY DIMENSIONED BEYOND CUTOFF FOR HIGHER ORDER MODES
Myron C. Selby, Boulder, Colo., assignor to the United States of America as represented by the Secretary of Commerce
Filed Oct. 22, 1965, Ser. No. 502,704
6 Claims. (Cl. 333—6)

This invention relates to a coaxial transmission line T-junction, and more particularly to a T-junction that is especially adapted for intercomparing coaxial line radio frequency voltage sensitive devices such as voltmeters, voltage detectors, voltage standing-wave ratio meters and the like, at frequencies up to and within the gigahertz range.

The intercomparison or calibration of two coaxial line radio frequency voltage sensitive devices requires that the two devices be connected in parallel to a source of variable frequency, variable amplitude radio frequency voltage. This is usually accomplished by connecting the two devices to the arms of a coaxial T-junction, and connecting the voltage source to the stem of the T. With the T's heretofore available, such an arrangement yields a comparison to a certain limited accuracy only in the event that the input impedances of the devices equal, or match, the characteristic impedances of the T arms. If the impedances are not matched, voltage standing waves resonate in the T and produce erroneous indications of the voltages actually supplied to the voltage sensitive devices. As is well known, it is extremely difficult to match impedances over a wide radio frequency spectrum that extends into the gigahertz range. Even when the impedances are matched, however, the accuracy may be limited because of the presence of perpendicularly intersecting cylindrical surfaces inside the T; this relatively large space at the very junction of the source and the two devices makes it possible for field irregularities to interact and change with the mechanical and electrical variations of the source and devices, depending on the operating wavelength.

Consequently, it has long been desired to provide a coaxial T-junction that would not require impedance matching between the arms and the devices connected thereto, and that would be relatively free from interactions between the field irregularities present in the arms of the T. Indeed, it has been desired that a T be provided that would tolerate a large mismatch, because many voltage sensitive devices have input impedances several orders of magnitude greater than the characteristic impedances of the prior art T's. These high input impedance devices draw relatively small currents and hence relatively small amounts of power from the sources whose voltages are to be detected. In the case at hand, where the two devices to be inter-compared are connected in parallel to an adjustable radio frequency voltage source via the T, the adjustable source can be rated at milliwatt output rather than at tens of watts output, if the devices have kilo-ohm input impedances, rather than tens of ohms impedances, as do the prior art coaxial T's.

Accordingly, an object of this invention is to provide a coaxial transmission line T-junction which will present the same voltage amplitudes at the input planes of the two devices under calibration, irrespective of the magnitude of the voltage standing waves present in the lines feeding the devices.

Another object is to provide a coaxial T which reduces to a negligible amount the influence of spurious modes upon the voltage amplitudes applied to the two devices being intercompared.

Another object is to provide a coaxial T which is easily fabricated, and is compact and rugged.

These and other objects of the invention will be readily understood when the following description is read in conjunction with the accompanying drawings, in which.

Figure 1:
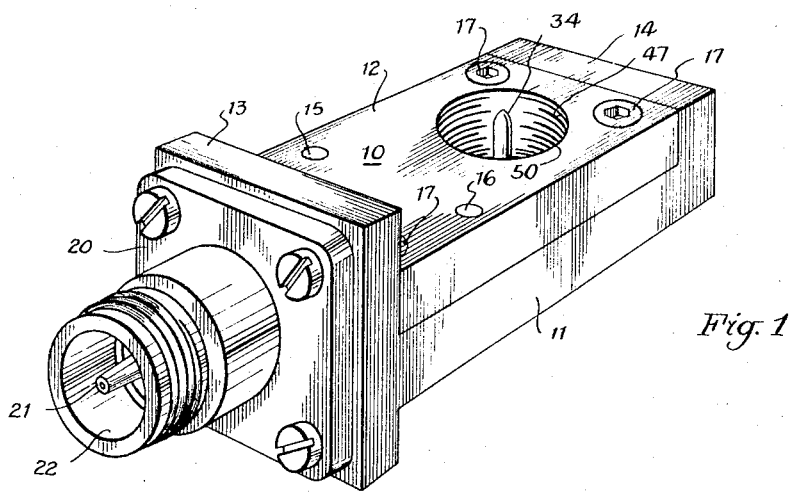
FIG. 1 is a perspective view of the coaxial T of the present invention.
Figure 2:
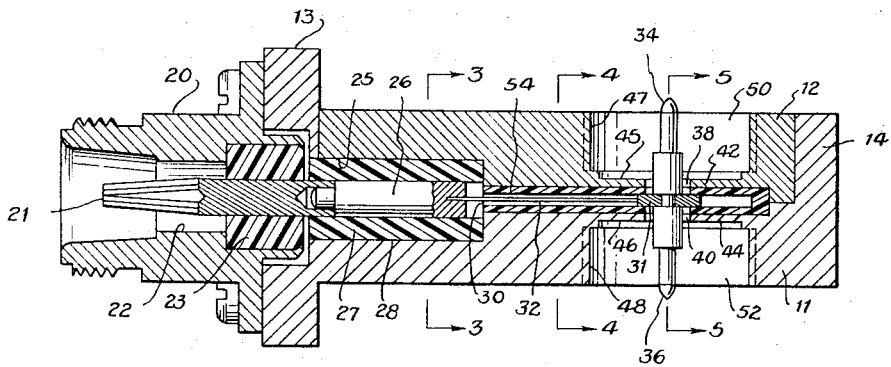
FIG. 2 is a longitudinal cross-sectional view of the T of FIG. 1.

Referring to FIGS. 1 and 2, it will be seen that the coaxial T of the present invention has a rectangular housing 10 formed from a pair of superimposed metal plates 11 and 12. The lower plate 11 has an integrally-formed front flange 13 and back flange 14, between which the upper plate 12 fits. The plates 11, 12 are aligned by a pair of alignment pins 15, 16 and secured by socket screws 17.

Figure 3:
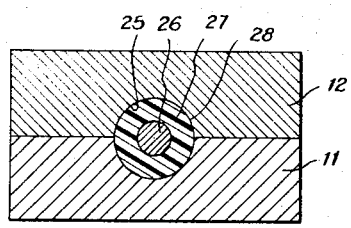

The front flange 13 receives the input or stem connector 20, which is a conventional coaxial connector having an inner conductor 21, outer conductor 22, and insulating sleeve 23 (FIG. 2). The inner conductor 21 projects a short distance through a hole in the flange 13 into a circular bore 25 that is formed in the adjacent surfaces of the soperimposed plates 11, 12, as may best be seen in FIG. 3. A short conductor 26 is connected to the inner conductor 21 of the connector 20, and is spaced from the bore 25 by an insulating sleeve 27. The bore 25, conductor 26 and sleeve 27 thus provides a short input coaxial line 28 for the T.

Figure 5:
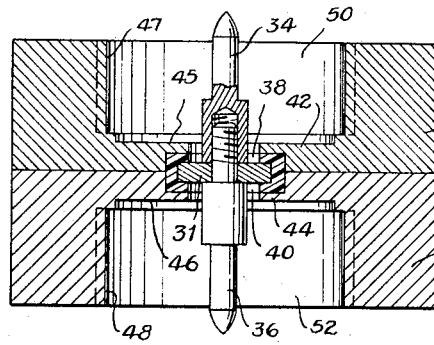
FIGS. 3–5 are transverse cross-sectional views taken on the lines 3—3, 4—4, and 5—5, respectively of FIG. 2.
Figure 4:
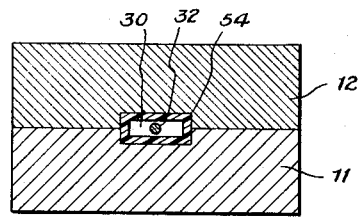

The input coaxial line 28 communicates with an axially-aligned passageway 30, which, as shown in FIG. 4, has a rectangular cross section. The width of the passageway 30 preferably is less than the outer diameter (bore 25) of the coaxial line 28, and the height of the passageway preferably is very much less than the outer diameter, so that the passageway 30 constitutes a waveguide beyond cutoff for any higher order modes introduced along the coaxial line 28. Disposed in the far end of the passageway 30 is a thin circular metal diaphragm 31 (see FIGS. 2 and 6) which is connected to the inner conductor 26 of coaxial line 28 by a thin wire 32. As shown in FIGS. 2 and 5, a pair of pins 34, 36 project orthogonally from opposite sides of the diaphragm 31 and extend through concentrically-arranged irises 38, 40. The irises 38, 40 are centrally located in thin circular outer diaphragms 42, 44 that are defined by the adjacent surfaces of the superimposed plates 11, 12 (and grooves forming the passageway 30) and by the bottom surfaces 45, 46 of a pair of threaded holes 47, 48. The threaded holes 47, 48 are formed in the plates 11, 12 to provide concentric outer connector elements for the pins 34, 36. The resultant coaxial connectors 50, 52 are the arm connectors of the coaxial T.

The diaphragm 31 and its conecting wire 32 are insulated from the walls of the passageway 30 by four thin layers of insulation 54 that line the passageway 30, as shown in FIGS. 2 and 4. Adjacent the pins 34, 36, the insulation 54 is apertured with holes of the same diameter and axial alignment as the irises 38, 40 (see FIGS. 2 and 5), whereby the pins 34, 36 project freely from the inner diaphragm 31 through the outer (grounded) diaphragms 42, 44. In this manner, the electromagnetic wave energy in the passageway 30 (waveguide beyond cutoff for higher order modes) is evenly divided and transmitted over very short distances to the arm connectors 50, 52. Since the path lengths from the inner diaphragm 31 through the outer diaphragms 42, 44 are very short, relative to the guide wavelength of the highest frequency wave to be applied to the stem connector 20, the presence of even the highest standing wave encountered in practice will have a negligible effect, enabling the T to operate into relatively high impedance voltage sensitive devices, with no appreciable error.

The radial widths of the irises 38 and 40 are preferably smaller than the radial spacing between the inside surfaces of the inner and outer conductors, thus forming a substantial shielding partition between the two arms of the T feeding the devices being calibrated. This shielding reduces the interaction between the fields inside the arms of the T, whereby the reading or response of one of the voltage sensitive devices is not affected by the other device with which it is being compared.

For good reproducibility over a large bandwidth of frequencies, the coaxial T must be fabricated to close tolerances. The diaphragms 31, 42, and 44 should be flat, uniform and parallel to each other, with the inner diaphragm 31 spaced midway in the passageway 30 between the outer diaphragm 42, 44. The axis of the pins 34, 36, irises 38, 40 are threaded holes 47, 48 should all be co-extensive and perpendicular to the planes of the diaphragms 31, 42, and 44.

Figure 6:
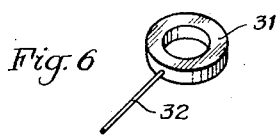
FIGS. 6–10 are perspective views of various diaphragms for use in the coaxial T of the invention.
Figure 7:
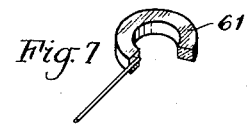
Figure 8:
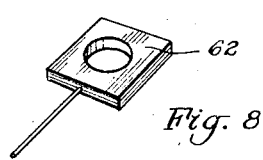
Figure 9:
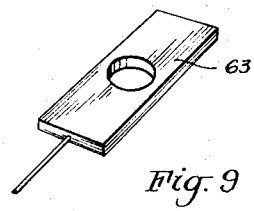
Figure 10:
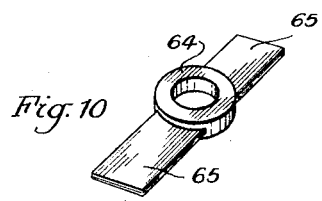

The inner diaphragm 31 illustrated in FIGS. 2, 5 and 6 is metal; alternatively, it may be fabricated from a suitable dielectric such as glass, as shown at 61 in FIG. 7. The shape of the diaphragm may be square as at 62 in FIG. 8, or rectangular as at 63 in FIG. 9. In FIG. 10, a further illustrative inner diaphragm comprises a circular portion 64 provided with rectangular projections 65. Each of these exemplary diaphragms establishes a unique electromagnetic field pattern in the coaxial T, and the selection of the diaphragm to be used in a particular situation will depend on the operating frequencies, and the characteristics of the loads to be connected to the T.

While the invention has been described by way of specific illustrative embodiments, it is intended that the invention include all such modifications and variations of the illustrated embodiments as fall within the scope of the appended claims.

What is claimed is:

1. A coaxial transmission line T-junction comprising,
    a metal housing,
    a stem coaxial connector mounted on said housing,
    a rectangular passageway formed in said housing,
    an inner diaphragm disposed in and insulated from said rectangular passageway,
    means disposed in said rectangular passageway and connecting said inner diaphragm to the inner conductor of said stem coaxial connector,
    said rectangular passageway being dimensioned to provide a waveguide beyond cutoff for any higher order modes introduced by said connecting means,
    a pair of outer diaphragms formed in said housing on opposite sides of said inner diaphragm,
    said outer diaphragms each having a central iris therein,
    a pair of pins projecting orthogonally from opposite sides of said inner diaphragm through said irises, and,
    outer connector means formed in said housing coaxially about said pins to provide a pair of arm coaxial connectors.

2. A T as set forth in claim 1, wherein said inner and outer diaphragms are parallel to each other.

3. A T as set forth in claim 1, wherein the inner surfaces of said rectangular passageway are lined with thin layers of insulation.

4. A T as set forth in claim 1, wherein said inner diaphragm is metallic or dielectric.

5. A T as set forth in claim 1, wherein said inner diaphragm is circular, square, rectangular, or a combination thereof.

6. A T as set forth in claim 1, wherein said housing comprises a pair of superimposed plates, said rectangular passageway being formed in the adjacent surfaces of said superimposed plates.

No references cited.

HERMAN KARL SAALBACH, *Primary Examiner.*

L. ALLAHUT, *Assistant Examiner.*